March 3, 1964     A. W. HUGHES     3,123,116
EMULSIFIER
Filed April 16, 1962     3 Sheets-Sheet 1
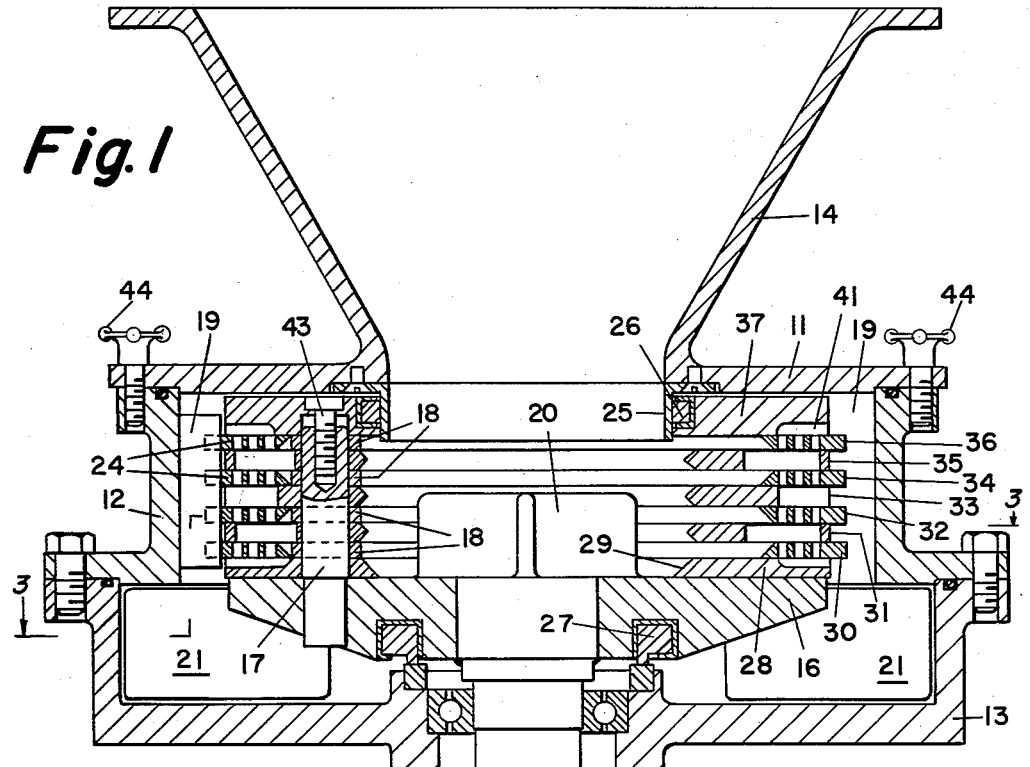
Fig.1
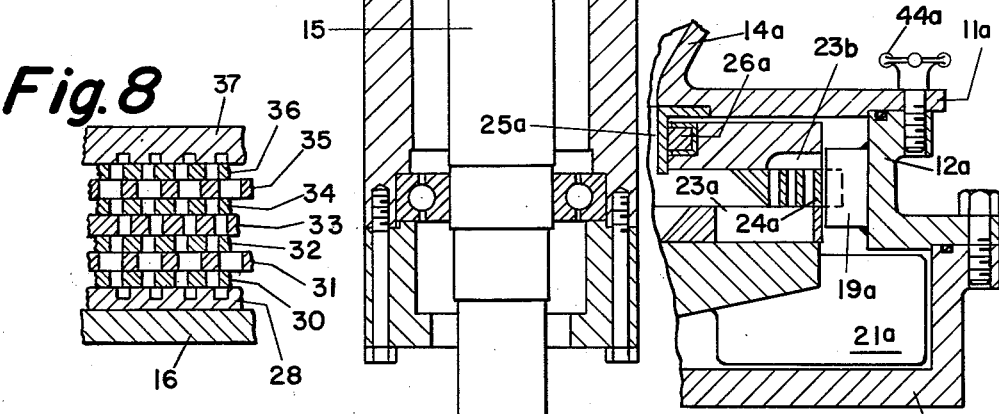
Fig.8
Fig.2
INVENTOR.
Alvin W. Hughes March 3, 1964  A. W. HUGHES  3,123,116
EMULSIFIER Filed April 16, 1962  3 Sheets-Sheet 2

INVENTOR.
Alvin W. Hughes

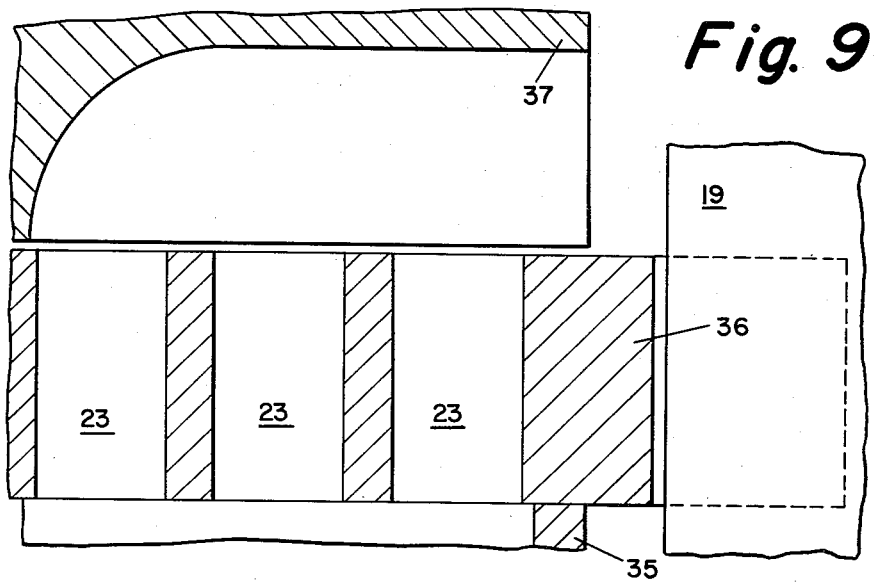
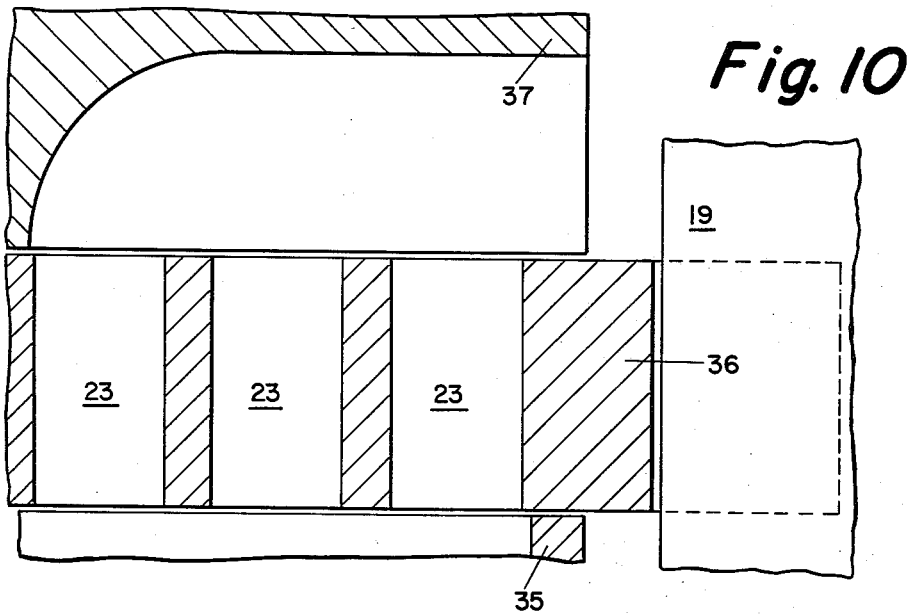

United States Patent Office
3,123,116
Patented Mar. 3, 1964

3,123,116
EMULSIFIER
Alvin W. Hughes, 194 Church Road, Bensenville, Ill.
Filed Apr. 16, 1962, Ser. No. 187,550
3 Claims. (Cl. 146—192)

This invention relates to an emulsifier especially desirable in the sausage industry for overcoming disadvantages of emulsifiers in use in the meat packing industry for treating the mixed ingredients of fresh sausage after having been prepared in a conventional sausage chopper. An object is to overcome some of the disadvantages in commonly used emulsifying apparatus in that industry. More specifically, the present invention provides a satisfactory emulsifier for fresh sausage mixtures which shortens the time required for chopping sausage in a chopper, has low maintenance, low heat input, is easily taken apart quickly for cleaning, has a long life, is not expensive, requires small power consumption, has emulsifying plates requiring only infrequent sharpening, and has no knives to replace or sharpen.

Meat packers have long needed an efficient emulsifying apparatus for fresh sausage such as bologna, frankfurters, and weiners because the fine emulsions are better able to retain the fats in suspension and keep them from separating out. Some emulsifiers in use today have included one or more perforate metal plates through which a batch of fresh sausage from the chopper is passed when one or more rotating knife blades pass rapidly over the perforated plates having meat exuding from them causing wear in the knife blades and plate as the knife blades are forced against a plate in shaving off fine particles of the meat. One objection to this prior apparatus has been the heat input into the product unless considerable ice is used, mixed in with the product. Another objection has been the high maintenance costs for sharpening the cutting knives and the grinding of the worn surface portions of the perforate plates passed over by the knives. Another reason for high maintenance costs has been the long time required to take the apparatus apart for cleaning and reassembling.

According to this invention, the heat input into the product being emulsified has been greatly reduced by eliminating the rubbing friction of the knives over the perforate plate surface whereby the heat input into the product has been approximately halved and more by providing a close spacing between plates without having them in actual rubbing contact. The plates or rings both rotatable and non-rotatable are easily removable as a unit for cleaning and reassembly. A factor contributing to simplicity in construction is the quick take out time for cleaning of all the plates as a unit. Another important factor has been the provision of one or more non-rotatable plates which are floating when in use. This invention has shortened the time required for material to be kept in the chopper, reduced the time required to attain a finely comminuted particle size, with simplicity, compactness and an unusually efficient time for attaining the desired emulsion.

Referring to the drawings:

FIG. 1 is a longitudinal section through a preferred embodiment of this invention.

FIG. 2 shows a partial section through a simplified embodiment.

FIG. 8 is a section on the line 8—8 of FIG. 3.

Figure 3:
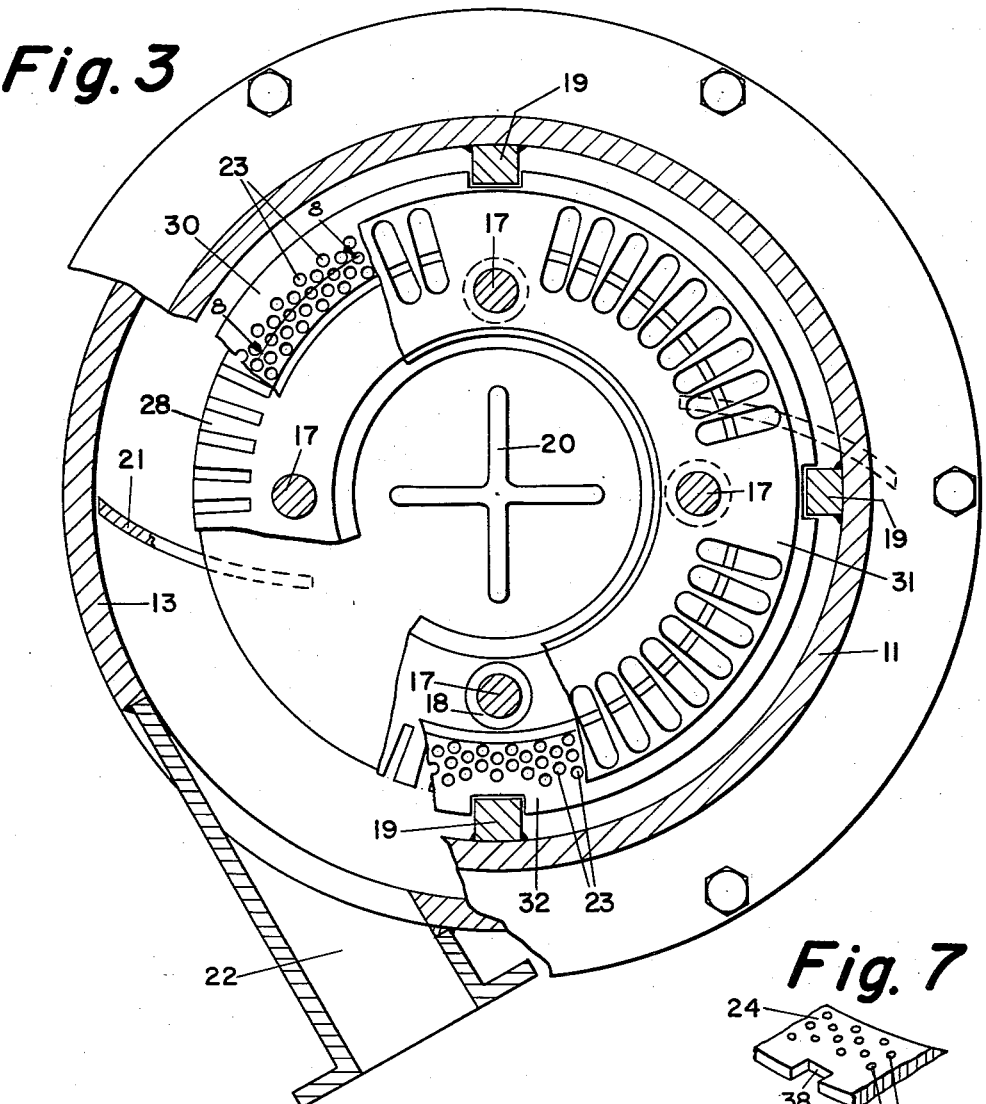
FIG. 3 is a top plan sectional view through some of various plates of the embodiment of FIG. 1 taken on the line 3—3 of FIG. 1 with various parts broken away at different levels.

FIG. 9 exemplifies a magnified section through a portion of a non-rotatable sizing ring or plate in contact with the rotatable plate below it and out of contact with the rotatable plate above it while the emulsifier is not in operation.

FIG. 10 illustrates the non-rotatable plate of FIG. 9 floating and spaced from both rotatable plates as it is in operation.

The embodiment of FIG. 1 includes an emulsifier for fresh sausage taken from the usual sausage chopper, not shown, and comprising a unitary stack of alternate rotatable and non-rotatable plates mounted in a casing in three principal parts 11, 12, and 13, surmounted by a hopper 14 into which the chopped sausage is fed. An upstanding drive shaft 15 carries the stack of both rotatable and non-rotatable plates when the emulsifier is not operating. When operating, the non-rotatable sizing rings or plates are floating out of contact with the rotatable plates above and below them. The rotatable plates are driven at a speed of about 1750 revolutions per minute. A head 16 carries the plates, and ball bearings shown, guide the shaft 15 within the lower casing section 13. The head 16 with plate 28 may be regarded as a single plate which in its central portion is imperforate to the passage of material through it, as shown in FIGS. 1 and 2. Posts 17 have the rotatable plates secured thereto in accurately spaced relation by means of spacing members 18. The non-rotatable plates, when the emulsifier is in operation, are floating between pairs of rotatable plates and are prevented from rotating by four ribs 19 secured to or integral with the casing side portion 12. When no material is being fed through the emulsifier these four non-rotatable plates are each carried by the rotatable plate beneath it and with which it contacts, being spaced from the rotatable plate above it by a distance of about .002 of an inch, which could vary from .001 to .004 of an inch depending on the kind of material being handled. In operation, the sausage material lifts the non-rotatable plates and spaces them substantially equally between the rotatable plates. In this way there is no large amount of scraping friction and wear, and the power input required to do a batch of sausage is about half that required for the type of emulsifier previously referred to. The present machine has the floating non-rotatable perforate plates and one of such plates is magnified many times between rotatable plates to show only a portion of the rotatable and non-rotatable plates in FIGS. 9 and 10, but not exactly to scale.

An input impeller 20 on the shaft 15 is directly beneath the inlet port and hopper 14 for throwing the material outwardly in the general planes of the plates. As shown in FIG. 1 each of the rotatable plates, except the topmost one, has its inner edge shaped to direct material upward or downward or both to have it centrifugally moved outward in the planes of the non-rotating plates. Output impeller vanes 21 sweep the emulsified material from the lower casing section 13 into the discharge pipe 22, through which it may move by gravity and the force imparted by the vanes 21.

The finely dividing of the material is believed to be due to a shaving, cutting, and shearing action between the edges of perforations 23 in the non-rotatable plates 24 and the edges of the recesses of various shapes in the rotatable plates secured on posts 17. Because the comminuting is performed without excessive friction and scraping between plates, the present emulsifier plates need sharpening only infrequently and on the rare occasions such is necessary, the grinding of flat plates is not difficult. More or less pairs of plates may be used. The use of the 9 plates shown in FIG. 1 was referred because it functioned so satisfactorily for different needs.

In FIG. 2 is illustrated a portion of a simplified emulsifier using only three plates, one non-rotatable plate 24a having perforations similar to those in the non-rotatable plates in FIG. 1 and two rotatable plates having recesses of different shapes. Around the bottom of the hopper 14a is placed a guide 25a for material to direct the material past the packing 26a and reduce the likelihood of any material being bypassed around the plates. In this simplified construction, the lower rotatable plate has its inner edge sloping to direct material thrown out by an input impeller (not shown) into the space within non-rotatable perforate plate 24a where it is subject to centrifugal force from the two rotatable plates as well as from the input impeller. The radially inner edge of non-rotatable plate 24a is shown as being inclined to direct the fed material downward into the elongated recesses 23a (of the type shown in FIG. 6). Here the material is again subjected to centrifugal force. Since the outer ends of these recesses 23a are closed, the moving material is forced upwardly through the perforations in the non-rotatable plate 24a (similar to the perforations shown in FIG. 7). Coming out of these perforations in plate 24a the material enters the recesses 23b on the under side of the rotatable upper plate, which recesses are similar in shape to those shown on the upper face of the plate in FIG. 5 except that there these recesses are on the upper face. Here again centrifugal force assists in throwing the finely divided material radially outward until it impinges the side wall of casing portion 12a, then falls into lower casing section 13a from which output impeller vanes 21a direct the material into a discharge pipe, not shown. The non-rotatable plate 24a has its periphery notched to engage rib 19a fixed to the side or middle casing section 12a and this plate is floating or spaced about .001 of an inch from the upper and lower rotating plates during operation and rests on the lower rotatable plate when the machine is not in use. As is true in FIG. 1 on removing upper casing cover section 11a the three plates are removable as a unit for cleaning.

Referring again to FIG. 1, the vanes of the input impeller 20 have been found of a suitable axial height or length but may need to be higher for other materials being emulsified. In both FIGS. 1 and 2 the material is cut or sheared or shaved by the edges of the recesses and perforations of the stationary and movable plates. The exact nature of this cutting has not been determined and should not need to be as the end product is satisfactorily finely divided. The upper packing ring 26 is needed for the prevention of material bypassing the plates. The lower packing ring 27 keeps the emulsified material from the shaft bearings.

The lowermost rotatable plate 28 has its inner edge 29 shaped to direct material upward into the plane of the adjacent non-rotatable plate 30 and the inner edge of plate 30 is likewise shaped to direct material upward into the elongated perforations or recesses of rotatable plate 31. In plate 31 the material is subject to more centrifugal force moving it radially outward until it impinges upon the closed outer ends of such recesses and then spreads axially both upward and downward through perforations 23 in the adjacent non-rotatable plates 30 and 32, thru which it passes to be centrifugally discharged radially outward by the rotatable plates 28 and 33. Thus a single piece of material within the recess of rotatable plate 31 may be subjected to being cut 2 times in its passage into the side casing section, once in going into an adjacent non-rotatable plate and again in moving from that plate into an adjacent movable plate. The number of cutting edges formed by the edges of recesses or perforations is surprising as may be understood from the following enumeration of them:

Number of part:
    28—lower plate—60 recesses
    30—lower non-rotatable plate—288 perforations
    31—rotatable plate—36 recesses or slots
    32—non-rotatable plate—288 perforations
    33—rotatable plate—60 recesses or discharge slots
    34—non-rotatable plate—288 perforations
    35—rotatable plate—36 recesses or slots
    36—non-rotatable plate—288 perforations
    37—upper rotatable plate—60 recesses or discharge slots In one revolution of the rotatable plates there are between plates 28 and 30, 60 discharge slots or recesses in plate 28, one edge of each such slot provides an opportunity for shearing or cutting with each one of the 288 perforations or 60 times 288 or an opportunity for 17,280 cuts. Between plate 30 and plate 31 with 36 slots there is an opportunity for 10,368 cuts. Adding up the chance for cutting in one revolution, there is a total of 110,592 chances for cutting. With 1750 revolutions per minute, the opportunities for cutting ascends to the vast total of 193,526,000 in one minute.

Figure 4:
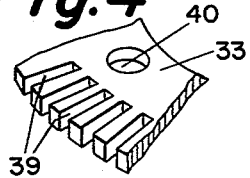
FIG. 4 illustrates an outer edge portion of the central rotatable plate of the stack in FIG. 1.
Figure 5:
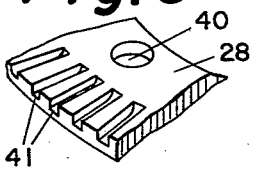
FIG. 5 shows the outer upper edge of a portion of the lowermost rotatable plate of FIG. 1.
Figure 6:
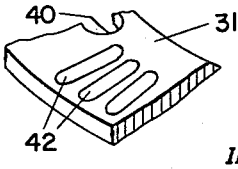
FIG. 6 represents an outer edge of the rotatable plate shown in the right half of FIG. 3.

It may now be readily appreciated that rotatable plate 33 shown in FIG. 4 is of the construction and shape indicated, the recesses 39 being for reception of material from a stationary plate each side of it. The hole 40 shown in rotatable plates in FIGS. 4, 5, and 6 is for the passage therethrough of one of the posts 17 to which each rotatable plate is clamped by spacers 18, other plates and the socket head screws 43. Plate 28 in FIG. 5 is the same as upper plate 37 except that plate 37 is thicker and the fact that its recesses 41 are on the under instead of the top side. In FIG. 6 plate 31 is similar to plate 35; they are each of the type having elongated recesses 42 in which the fed material has an opportunity to be centrifugally moved before being directed into a non-rotatable plate above and below it. The non-rotatable plates 24 (FIG. 7) each has many perforations 23 and a notch 38 in the periphery in which the rib 19 is received to prevent rotation.

In loosening and removing the manually releasable bolt heads 44 illustrated in the casing cover 11, the entire number of rotatable and non-rotatable plates may be lifted out as a unit. The hopper 14 is removed with casing cover 11. The removal of all plates both rotatable and non-rotatable including spacers 18, is possible from posts 17 by removal of the socket head screws 43 at the top of each post. After washing the plates and spacers 18 with hot water they may then be assembled. The entire cleaning operation should take less than about 10 minutes. This is a big saving in time over that required for cleaning prior emulsifiers. The non-rotatable plates resting on the rotatable plates beneath it are slidable easily up the ribs 19 and off along with the rotatable plates. No substantial quantity of material leaks out from between plates at the periphery with the small clearance provided, but the reason is not understood. Perhaps the self lubricating material being emulsified contains enough fat to assist in forming a seal.

This FIG. 1 embodiment is a surprisingly compact emulsifier for its work capacity, being less than a foot in diameter and axial length. The rotatable and non-rotatable plates are of hard tempered steel. It has been discovered that the plates in operation should not be spaced closer together than about .0005 of an inch when consideration is given to the degree of precision in flatness of the plates compatible with reasonable production costs. With this .0005 spacing between plates it has been found that after operation for a time to do several batches of sausage, there will be visible marks indicating an adjacent plate has rubbed on it slightly.

This emulsifier possesses the following advantages, given in the approximate order of their importance:

(1) It produces an exceptionally fine and stable emulsion.

(2) Only about half the temperature rise in the material being emulsified is present in this apparatus as compared with other emulsifiers under similar conditions.

(3) The power consumption is only about half that of other emulsifiers.

(4) A fine stable emulsion is produced from sausage materials which have been pre-cut in a sausage cutter for about half the usual pre-cutting time. This means increased processing capacity without increasing equipment or manpower.

(5) Time for cleaning, take down and reassembling is about half that of other emulsifiers.

(6) Cost of maintenance is reduced also about half.

A larger supplementary hopper attached to hopper 14 may not be needed where a pipe delivers sausage to this emulsifier from a chopper. A small 135 pound batch of sausage material has been passed through this emulsifier in less than a minute. This emulsifier occupies less than one cubic foot of space. The usual sausage material is emulsified in batches from a chopper. A feature contributing to the large work load for this compact emulsifier is believed to be the close spacing for the numerous perforations in the non-rotatable plates, which perforations are only ⅛ of an inch in diameter. With a usual plate thickness of about one fifth of an inch, the depth of all plates is comparatively small. The clearance space at the top and bottom of each non-rotatable plate in FIG. 10 is only .001 of an inch to obtain the floating advantage when the spacer needs to be .002 of an inch thicker than the non-rotatable plate for which it maintains the adequate space for this floating movement.

The bolts for cover section 11 of the casing, as well as other casing bolts, may be of the type with hexagonal or square heads or may have much enlarged heads to be tightened and loosened entirely by hand.

Figure 7:
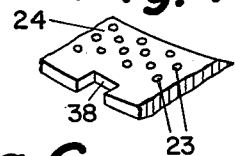
FIG. 7 is a non-rotatable plate outer edge portion.

The radial rows of perforations 23 in FIG. 7 are angularly spaced about 1½ degrees. The perforations 42 in FIG. 6 are about ⅞ of an inch long by about ¼ inch wide with their longitudinal center lines angularly spaced about 7½ degrees. The recesses 41 in FIG. 5 are about ⅛ of an inch deep and about ⅝ of an inch long with their longitudinal center lines spaced about 6 degrees. The recesses 39 in FIG. 4 are about the same width spacing and length as in FIG. 5 except that these recesses 39 extend entirely through the plate. About the only critical dimension is that the floating non-rotatable plate should be spaced not less than .0005 of an inch from an adjacent rotatable plate. In very general terms, the more recesses and perforations there are, the more frequent the cutting of particles.

This apparatus has been found desirable for other materials than that for which it was designed.

Each rotatable plate in FIG. 1 below the plate 37 functions as a feed plate in a substantial portion of its radial depth to the extent that it assists in imparting some centrifugal force to the material moving generally radially outward on its upper surface. The non-rotatable perforate plates may be said to possess a sizing function since the edges of the perforations cooperate with the edges of the recesses in the rotating plates in doing the cutting or shearing. The radially outer portions of rotatable plates 37, 33, and 28 possess a discharge function to the extent that material is forced out the peripherally open ends of their elongated recesses or slots. The elongated recesses in plates 35 and 31 possess a feed function in that centrifugal force together with the force from the input impeller put the material under pressure for forcing the material in opposite directions through the perforate non-rotatable plates 36, 34, 32, and 30.

The possibility of leakage of material radially outward from the peripheral edges of the clearance spaces between the plates is believed negligible. Perhaps one reason is that sausage material is quite viscous and is believed to possess substantial internal friction as well as substantial friction against a metal surface.

I claim:

1. An emulsifier comprising a hopper into which sausage to be comminuted is supplied, a casing supporting said hopper, an upstanding drive shaft substantially axially alined with said hopper, at least a pair of spaced rotatable recessed plates driven by said shaft, a non-rotatable perforate plate between said pair of rotatable plates, an impeller beneath said hopper and on said shaft for moving material from said hopper generally radially outward in the planes of said plates, said rotatable plates extending radially inwardly more than does said non-rotatable plate whereby material thrown out by said impeller is subjected to centrifugal force from said rotatable plates, said non-rotatable plate being shaped to direct material into at least one rotatable plate, each rotatable plate being provided with radially elongated recesses therein whereby material is centrifugally fed radially outward in said elongated recesses, the radially outer ends of said elongated recesses in at least one of said rotatable plates being blocked against egress of material to force the fed material through perforations in said non-rotatable plate when the edges of the perforations in the non-rotatable plate and edges of the elongated recesses in the rotatable plates engage the fed material to cut such material into finer pieces, said other rotatable plate being provided with elongated channels open at their outer ends for discharge of the material radially outward under centrifugal force within said other rotatable plate, a discharge impeller to engage material discharged by said last mentioned rotatable plate, and a discharge pipe for material forced out by said discharge impeller, the rotating plates being each spaced axially from said non-rotatable plate at least about .0005 of an inch and not more than a few thousandths of an inch during operation.

2. A combination according to claim 1 in which there are at least four non-rotatable plates and five rotatable plates, the lowermost plate being rotatable, the next and second plate from the bottom being non-rotatable and having its inner edge shaped to direct material into an elongated recess of said rotatable third plate from the bottom, the outer edge of said elongated recess in said third plate from the bottom being closed whereby material is directed into said third plate from the bottom, into perforations of said non-rotatable second plate from the bottom and through that into an elongated recess in the bottom rotatable plate open at its outer end, an inner edge of said third plate from the bottom being oppositely tapered to direct material into a non-rotatable plate next above and below it, the fourth plate from the bottom being non-rotatable and having an inner edge bevelled to direct material into said third and rotatable plate from the bottom from which material is directed upward as well as downward through perforations in an adjacent non-rotatable plate above and below it, the rotatable fifth plate from the bottom having open outer end elongated recesses receiving material from the non-rotatable plate above and below it into its elongated recesses, and the topmost or ninth plate from the bottom being rotatable with its elongated recess having an open peripheral end and receiving material from the eighth or non-rotatable plate from the bottom, and packing carried by an inner edge of said rotatable ninth plate from the bottom engaging a downward projection from said hopper.

3. An emulsifier comprising a hopper into which sausage to be comminuted is supplied, a casing supporting said hopper, a drive shaft within said casing, at least a pair of spaced rotatable recessed plates driven by said shaft, a non-rotatable perforate plate between the rotatable plates of said pair, an impeller on said shaft within some of said plates and within said casing for moving material radially outward, said rotatable plates extending radially inwardly more than said non-rotatable plate whereby material thrown out by said impeller is subjected to centrifugal force from at least one of said rotatable plates, said non-rotatable plate being shaped to direct material into recesses of at least one rotatable plate, each rotatable plate being provided with radially elongated recesses therein whereby material is centrifugally fed radially outward; the radially outer ends of said elongated recesses in at least one of said rotatable plates being blocked against egress of material to force the fed material through perforations in said non-rotatable plate when the edges of the perforations in the non-rotatable plate and edges of the elongated recesses in the rotatable plates engage the fed material to cut such material into finer pieces, at least one of said rotatable plates being provided with said elongated channels open at their outer ends for discharge of the material radially outward under centrifugal force, a discharge impeller to engage material discharged by said last mentioned rotatable plate, and a discharge pipe for material forced out by said impeller, the rotating plates being each spaced axially from said non-rotatable plate at least about .0005 of an inch and not more than a few thousandths of an inch during operation; there being at least four non-rotatable plates and five rotatable plates, the endmost plate in each direction being rotatable, the next and second plate from each end being non-rotatable and having its inner edge shaped to direct material into an elongated recess of said rotatable third plate from each end, the outer edge of said elongated recess in said third plate from each end being closed whereby material is directed into perforations of said non-rotatable second plate and through that into an elongated recess in an end rotatable plate open at its outer end, an inner edge of said third plate being oppositely tapered to direct material into a non-rotatable second plate, the fourth plate from each end being non-rotatable and having an inner edge bevelled to direct material into said third and rotatable plate from each end from which material is directed in opposite longitudinal directions through perforations in an adjacent non-rotatable plate on each side of it, the rotatable fifth plate from either end having elongated recesses with an open outer end, and elongated recesses receiving material from a non-rotatable on each side of it into its elongated recesses, and the endmost or ninth plate from each end being rotatable with its elongated recesses having an open peripheral end and receiving material from the eighth plate from either end, and packing carried by an inner edge of said rotatable ninth plate nearest to the hopper input into said plates engaging a downward projection from said hopper.

References Cited in the file of this patent

UNITED STATES PATENTS

| | | |
|---|---|---|
| 676,461 | Geisel | June 18, 1901 |
| 756,713 | Sander | Apr. 5, 1904 |
| 2,645,982 | Cowles | July 21, 1953 |
| 2,734,728 | Myers | Feb. 14, 1956 |